United States Patent
Koike et al.

(10) Patent No.: US 9,796,150 B2
(45) Date of Patent: Oct. 24, 2017

(54) APPARATUS AND METHOD FOR MANUFACTURING FIELD-POLE MAGNET

(75) Inventors: Yasuhisa Koike, Fujisawa (JP); Kimio Nishimura, Yokohama (JP); Hiroharu Takeuchi, Yokohama (JP); Kunitomo Ishiguro, Odawara (JP); Kiyoshi Hasegawa, Yokohama (JP); Yoshinori Izawa, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 170 days.

(21) Appl. No.: 14/234,746

(22) PCT Filed: Jun. 20, 2012

(86) PCT No.: PCT/JP2012/065769
§ 371 (c)(1),
(2), (4) Date: Jan. 24, 2014

(87) PCT Pub. No.: WO2013/015047
PCT Pub. Date: Jan. 31, 2013

(65) Prior Publication Data
US 2014/0144337 A1    May 29, 2014

(30) Foreign Application Priority Data
Jul. 27, 2011    (JP) .................................. 2011-164245

(51) Int. Cl.
B30B 15/00    (2006.01)
B30B 13/00    (2006.01)
(Continued)

(52) U.S. Cl.
CPC ............. *B30B 15/0082* (2013.01); *B26F 1/38* (2013.01); *B26F 3/002* (2013.01); *B28D 1/222* (2013.01); *B28D 7/02* (2013.01); *B30B 13/00* (2013.01); *H01F 41/0253* (2013.01); *H02K 15/03* (2013.01)

(58) Field of Classification Search
CPC ............. B30B 15/0082; H01F 41/0253; H01F 7/0221; H02K 15/03; H02K 1/27;
(Continued)

(56) References Cited

U.S. PATENT DOCUMENTS 6,634,089 B1 * 10/2003 Aoki .................... B09B 5/00
29/596
7,127,802 B1 * 10/2006 Damadian ............. G01R 33/28
248/236
(Continued)

FOREIGN PATENT DOCUMENTS

CN    1265947 C    7/2006
JP    63-34103 A    2/1988
(Continued)

OTHER PUBLICATIONS

Korean Office Action, Dec. 8, 2014, 5 pages.

*Primary Examiner* — Jimmy T Nguyen
(74) *Attorney, Agent, or Firm* — Foley & Lardner LLP (57) ABSTRACT

A field-pole magnet manufacturing apparatus manufactures magnet pieces that constitute a field-pole magnet arranged in a rotary electric machine by fracturing the magnet. This manufacturing apparatus includes: a support unit on which the magnet is placed; a fracture unit that is arranged opposite to the support unit across the magnet and is configured to fracture the magnet by pressing the magnet while in contact with the magnet; and a powder removal unit that is configured to remove crush powder produced by fracture of the magnet.

10 Claims, 10 Drawing Sheets

(51) Int. Cl.
  *B26F 3/00* (2006.01)
  *B26F 1/38* (2006.01)
  *B28D 1/22* (2006.01)
  *B28D 7/02* (2006.01)
  *H02K 15/03* (2006.01)
  *H01F 41/02* (2006.01)

(58) Field of Classification Search
  CPC .............. H02K 1/276; Y10T 29/49075; Y10T 29/49817; B28D 1/222; B28D 7/02; B26F 3/00; B26F 3/002; B23D 31/002
  USPC ........ 100/39, 90, 91, 94, 98 R; 29/417, 428, 29/607
  See application file for complete search history.

(56) References Cited

U.S. PATENT DOCUMENTS

| | | |
|---|---|---|
| 8,113,401 B2 | 2/2012 | Choo et al. |
| 2004/0074366 A1* | 4/2004 | Choo .................... C03B 33/03 83/886 |
| 2010/0258605 A1 | 10/2010 | Choo et al. |
| 2012/0036696 A1* | 2/2012 | Murakami ............ H01F 7/0221 29/426.2 |
| 2012/0104064 A1* | 5/2012 | Nishikuma ............. B26F 3/002 225/1 |
| 2012/0125969 A1 | 5/2012 | Nishikuma et al. |
| 2013/0057374 A1* | 3/2013 | Adachi ................ H01F 7/0221 335/306 |

FOREIGN PATENT DOCUMENTS

| | | |
|---|---|---|
| JP | 2004-145337 A | 5/2004 |
| JP | 2008-244222 | 10/2008 |
| JP | 2009-142081 A | 6/2009 |
| JP | 2010-142671 A | 7/2010 |
| JP | 2010-259231 A | 11/2010 |
| KR | 10-2004-0035508 A | 4/2004 |
| WO | WO 2011/013209 A1 | 2/2011 |

* cited by examiner

APPARATUS AND METHOD FOR MANUFACTURING FIELD-POLE MAGNET

TECHNICAL FIELD

The present invention relates to an apparatus and a method for manufacturing a field-pole magnet arranged in a rotor core of a permanent magnet-embedded rotary electric machine.

BACKGROUND ART

A technique is known to reduce eddy current caused by a fluctuation in an active magnetic field by fracturing a field-pole magnet arranged in a rotor core of a permanent magnet-embedded rotary electric machine into smaller pieces, that is to say, by reducing the surface area of the field-pole magnet. In this way, heating of the field-pole magnet associated with eddy current can be suppressed, and irreversible thermal demagnetization is prevented (see JP 2009-142081A).

According to the technique described in JP 2009-142081A, a cutout is provided to a field-pole magnet in advance as an index of fracture, and then the field-pole magnet is inserted into a container that is filled with resin and has an inner space having the same size and shape as a rotor slot. The field-pole magnet is fractured into magnet pieces inside the container so that the resin penetrates between the magnet pieces at the same time as the fracture.

SUMMARY OF INVENTION

Incidentally, fracture of a field-pole magnet into magnet pieces may result in abnormal fracture in which fracture surfaces of the magnet pieces do not match the intended fracture surfaces or become two-pronged. Abnormal fracture could possibly lead to deterioration in the accuracy of fracture surfaces. Abnormal fracture is assumed to occur due to either a pair of support units of a lower tool, or a blade of an upper tool, hitting the field-pole magnet only partially at the time of fracture. The reason why either the blade or the pair of support units of the lower tool hits the field-pole magnet only partially is assumed to be because foreign substances produced at the time of fracture, such as fine powder, are jammed between the pair of support units of the lower tool and the brittle field-pole magnet, and because of the foreign substances, the field-pole magnet is supported while being separated from the lower tool.

The present invention has been made in view of the above problem, and aims to provide an apparatus and a method for manufacturing a field-pole magnet arranged in a rotor core of a rotary electric machine that are suitable for improving the accuracy of fracture surfaces.

A field-pole magnet manufacturing apparatus in one embodiment manufactures magnet pieces that constitute a field-pole magnet arranged in a rotary electric machine by fracturing the magnet. This field-pole magnet manufacturing apparatus includes: a support unit on which the magnet is placed; a fracture unit that is arranged opposite to the support unit across the magnet and is configured to fracture the magnet by pressing the magnet while in contact with the magnet; and a powder removal unit that is configured to remove crush powder produced by fracture of the magnet.

Embodiments and advantages of the present invention will be described below in detail with reference to the attached drawings.

DESCRIPTION OF EMBODIMENTS

First, a description is given of a field-pole magnet arranged in a rotor core of a rotary electric machine.

Figure 1:
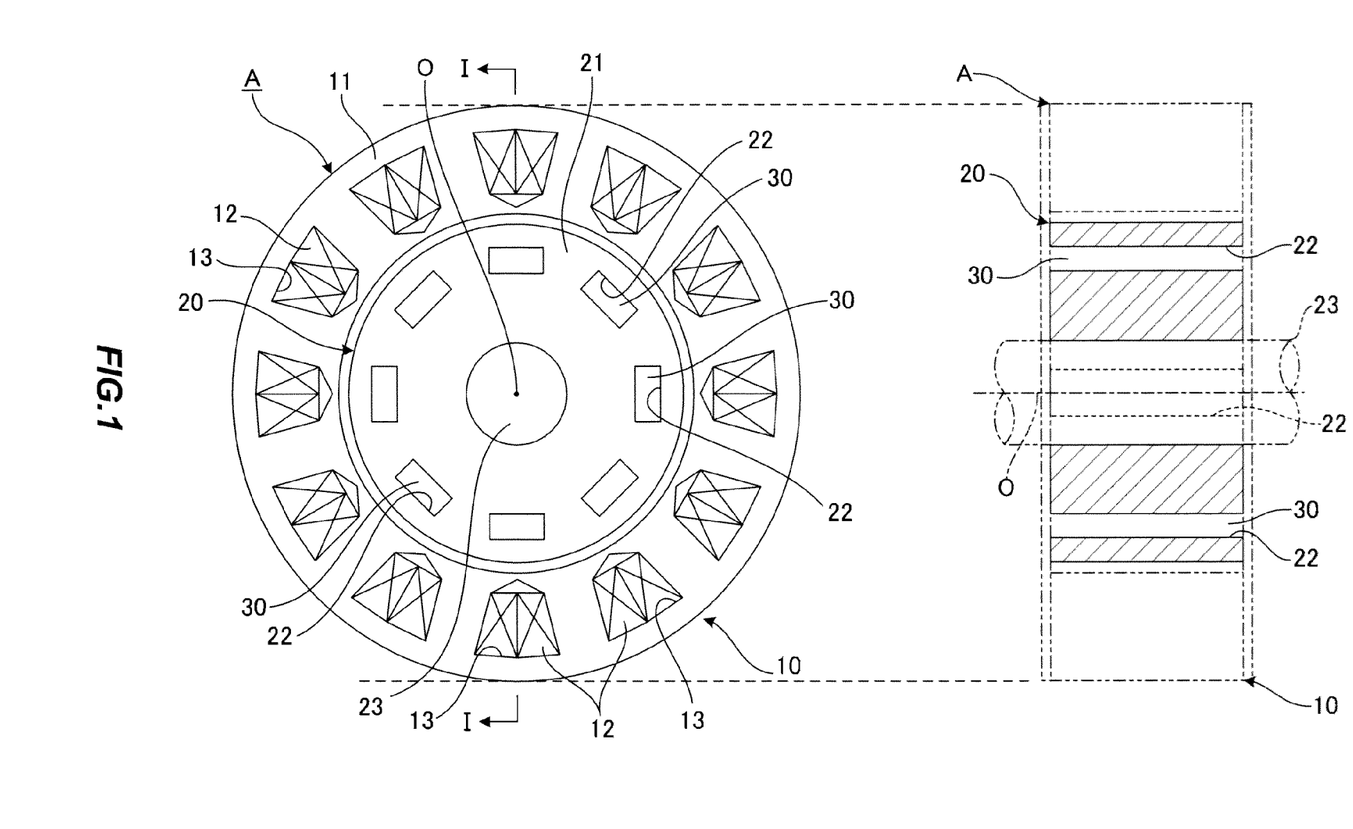
FIG. 1 is a schematic view showing configurations of major components of a permanent magnet type electric motor that utilizes a magnet manufactured by a field-pole magnet manufacturing apparatus according to embodiments.

FIG. 1 is a schematic view showing configurations of major components of a permanent magnet type electric motor that utilizes a magnet manufactured by a field-pole magnet manufacturing apparatus according to embodiments. More specifically, FIG. 1 shows a cross-sectional view and a side view of the permanent magnet type electric motor on the left side and the right side, respectively. In FIG. 1, a permanent magnet-embedded rotary electric machine A (hereinafter simply referred to as "rotary electric machine") includes a stator 10 having a shape of a circular ring and a rotor 20 having a shape of a circular cylinder. The stator 10 constitutes a part of a casing, which is not shown in the drawings. The rotor 20 is arranged coaxially with this stator 10.

The stator 10 includes a stator core 11 and a plurality of coils 12. The plurality of coils 12 are housed in slots 13 that are formed in the stator core 11 at an equal angular interval on the same circumference around an axial center O, which is the origin.

The rotor 20 includes a rotor core 21, a rotary shaft 23 that rotates integrally with the rotor core 21, and a plurality of field-pole magnets 30. The plurality of field-pole magnets 30 are housed in slots 22 that are formed at an equal angular interval on the same circumference around the axial center C, which is the origin.

Figure 2:
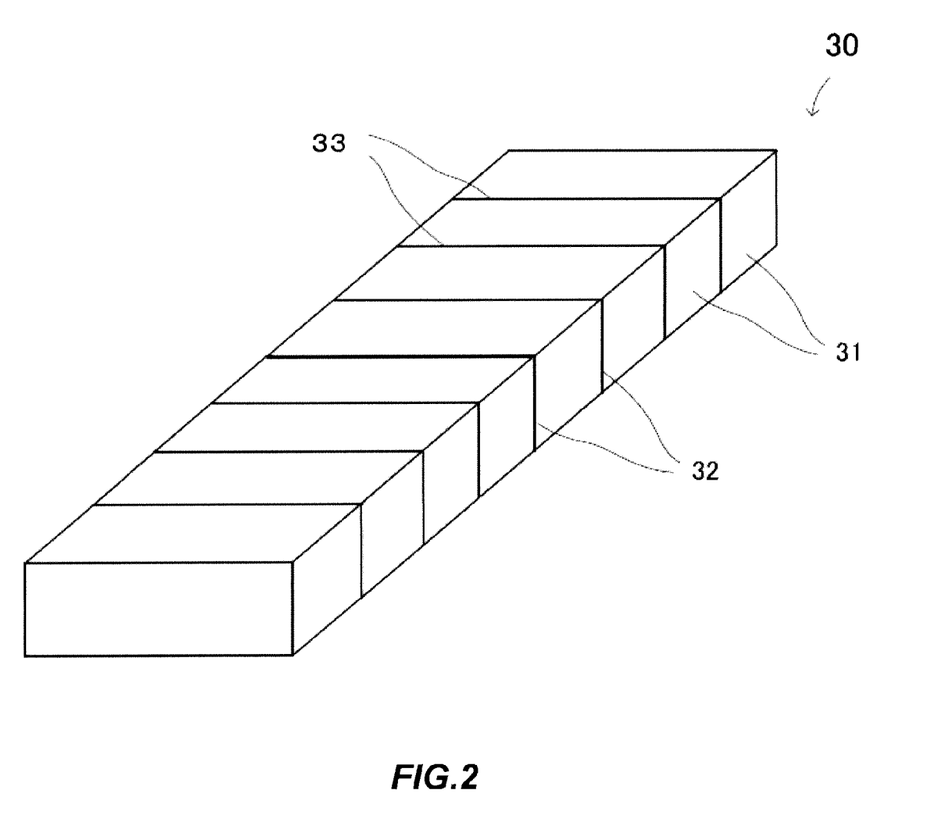
FIG. 2 shows a configuration of a magnet.

As shown in FIG. 2, the field-pole magnet 30 housed in each slot 22 of the rotor 20 is configured as an aggregate of a plurality of magnet pieces 31, which are obtained by fracturing the field-pole magnet 30 into smaller pieces. More specifically, each field-pole magnet 30 is configured as an aggregate of the plurality of magnet pieces 31 that are aligned by bonding fracture surfaces of the magnet pieces 31 using resin 32. The resin 32 used herein has, for example, a heat resistance up to approximately 200° C., and provides electric insulation between adjacent magnet pieces 31. Therefore, eddy current caused by a fluctuation in an active magnetic field is reduced by keeping the eddy current within each magnet piece 31. As a result, heating of the field-pole magnets 30 associated with the eddy current is suppressed, and irreversible thermal demagnetization is prevented.

In order to fracture the field-pole magnets 30 into the plurality of magnet pieces 31, it is beneficial to form cutout grooves 33 in advance at sites of the field-pole magnets 30 to be fractured (intended fracture surfaces). Although the following describes the field-pole magnets 30 on which the cutout grooves 33 are formed, these cutout grooves 33 are not indispensable. In other words, if the field-pole magnets 30 can be fractured without forming the cutout grooves 33, the cutout grooves 33 may not be formed on the field-pole magnets 30. The greater the depth of the cutout grooves 33 from the front surfaces and the sharper the distal ends of the cutout grooves 33, the flatter the fracture surfaces of the fractured magnet pieces 31.

The cutout grooves 33 may be formed, for example, in a formation process for the field-pole magnets 30 via groove-forming projections provided in a (lie used to form the field-pole magnets 30, by machining using a dicer and the like, and by laser beam emission.

The following describes an apparatus and a method for manufacturing the field-pole magnets 30 used in the permanent magnet-embedded rotary electric machine A based on embodiments.

First Embodiment

Figure 3:
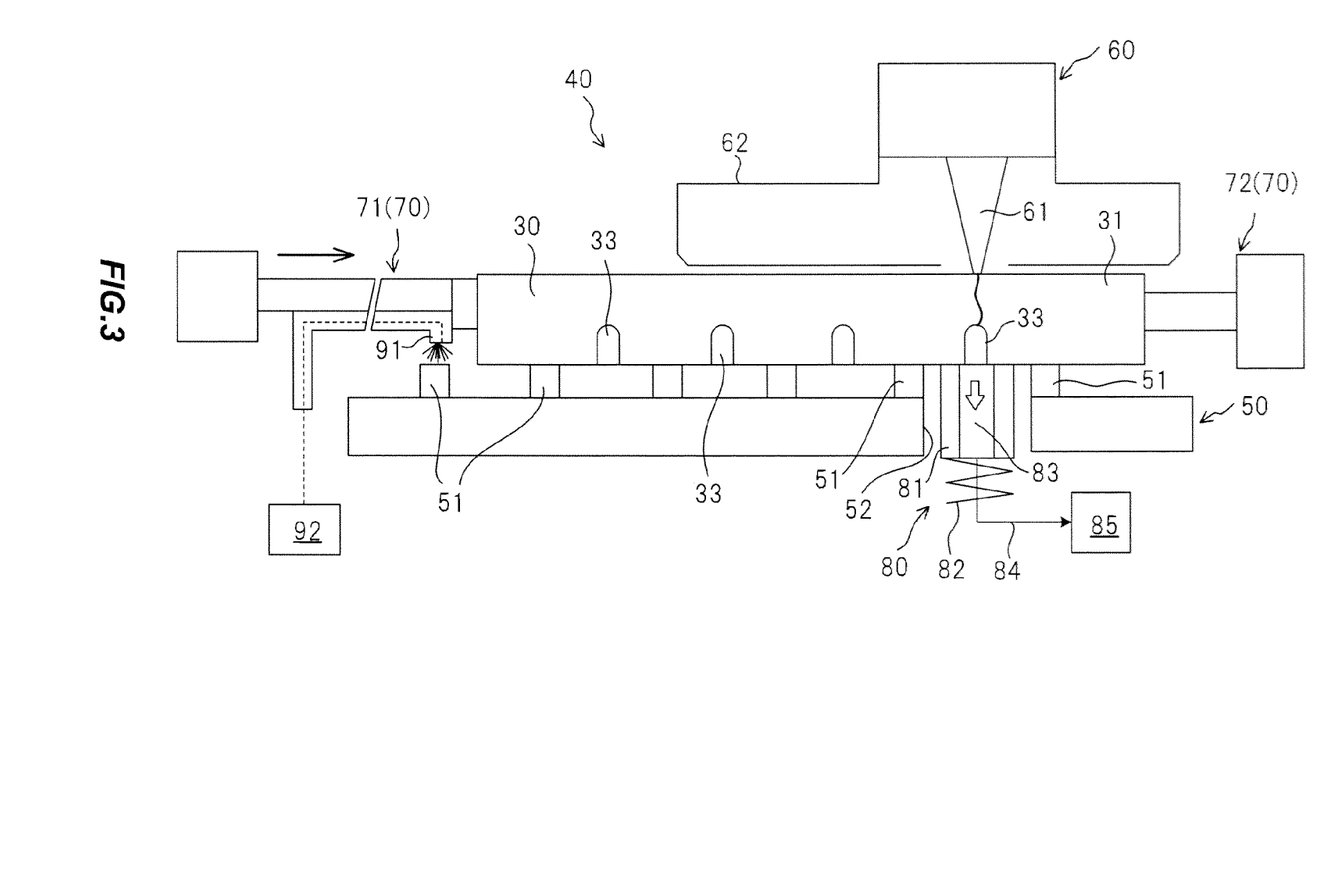
FIG. 3 is a schematic configuration view showing a field-pole magnet manufacturing apparatus according to a first embodiment.
Figure 4:
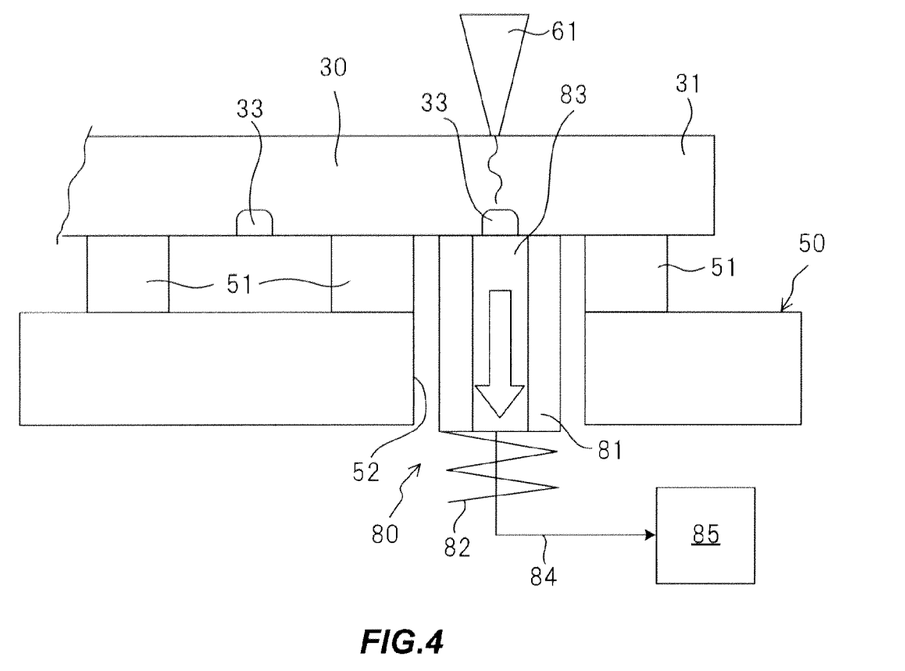
FIG. 4 is an enlarged view showing major components of the field-pole magnet manufacturing apparatus shown in FIG. 3.

FIG. 3 is a schematic configuration view showing a magnet fracture apparatus representing a field-pole magnet manufacturing apparatus according to a first embodiment. FIG. 4 is an enlarged view showing major components of the magnet fracture apparatus. A magnet fracture apparatus 40 for a field-pole magnet (hereinafter simply referred to as "magnet") 30 fractures the magnet 30 into a plurality of magnet pieces 31. The magnet fracture apparatus 40 includes a tool set composed of a lower tool 50 and an upper tool 60. The lower tool 50 supports and guides the magnet 30. After the position of the magnet 30 has been set, the upper tool 60 fractures the magnet 30 by pressing a blade 61 against the magnet 30. The magnet fracture apparatus 40 also includes a positioning device 70 and a suction device 80. The positioning device 70 sequentially moves the magnet 30 supported by the lower tool 50 so as to set the magnet 30 at a fracture position. The suction device 80 suctions and discharges crush powder (also referred to as contaminant) produced at the time of fracture.

The lower tool 50, which supports and guides the magnet 30, has a plurality of projections 51 on the upper surface thereof. The lower tool 50 supports the magnet 30 from below using the upper surfaces of these projections 51. The lower tool 50 also has a through-hole 52 that opens to the lower side thereof at a position corresponding to the blade 61 of the upper tool 60. The suction device 80 is provided inside this through-hole 52.

The upper tool 60 includes the blade 61 and a magnet bounce prevention clamp 62. The blade 61 is used to fracture the positioned magnet 30. The magnet bounce prevention clamp 62 suppresses bouncing of the magnet 30 at the time of fracture. The blade 61 has a sharp blade edge that faces the magnet 30 and extends along the width direction of the magnet 30. When the blade 61 is lowered by the upper tool 60, the blade edge thereof is pushed down while in contact with an intended fracture surface of the magnet 30, and the magnet 30 is bent in the form of three-point bending involving the blade edge and a pair of projections 51 located at the front side and the rear side of the through-hole 52 of the lower tool 50. As a result, the magnet 30 is fractured. The magnet bounce prevention clamp 62 is made of a plate spring with a proximal portion fixed to the upper tool 60, and suppresses bouncing of the fractured magnet 30 (especially, a magnet piece 31 at the distal end side) by pressing the magnet 30 against the lower tool 50 using the spring action thereof.

The positioning device 70 includes a pusher 71 and a holder 72. The pusher 71 presses the magnet 30 while in contact with the rear end of the magnet 30. The holder 72 holds the magnet 30 while in contact with the front end of the magnet 30. The pusher 71 has a servomotor for pushing the magnet 30. Each time a fracture operation is executed, the pusher 71 repeats an operation for pushing the magnet 30 by one pitch of a predetermined length defined by the cutout grooves 33. In this way, the positions of intended fracture surfaces of the magnet 30 are sequentially set.

Each time the pusher 71 pushes the magnet 30 by one pitch, the holder 72 applies a braking force to the magnet 30 by coming into contact with the front end of the magnet 30 so as to prevent the magnet 30 from moving by a distance longer than the distance by which the magnet 30 was pushed by the pusher 71. The action of the holder 72 improves the accuracy of setting the position of the magnet 30. Therefore, at the time of fracturing the magnet 30, the holder 72 comes out of contact with the front end of the magnet 30 so as to allow movement of the front magnet piece 31 that has been fractured off the magnet 30.

The pusher 71 has a blowoff nozzle 91 as a cleaning means facing downward, i.e. toward the lower tool 50. The blowoff nozzle 91 blows the air supplied from an air supply source 92. With the action of the air blown from the nozzle 91, crush powder (also referred to as contaminant) accumulated on the upper surfaces of the projections 51 of the lower tool 50 supporting the magnet 30 is blown out of the tool set.

Figure 5:
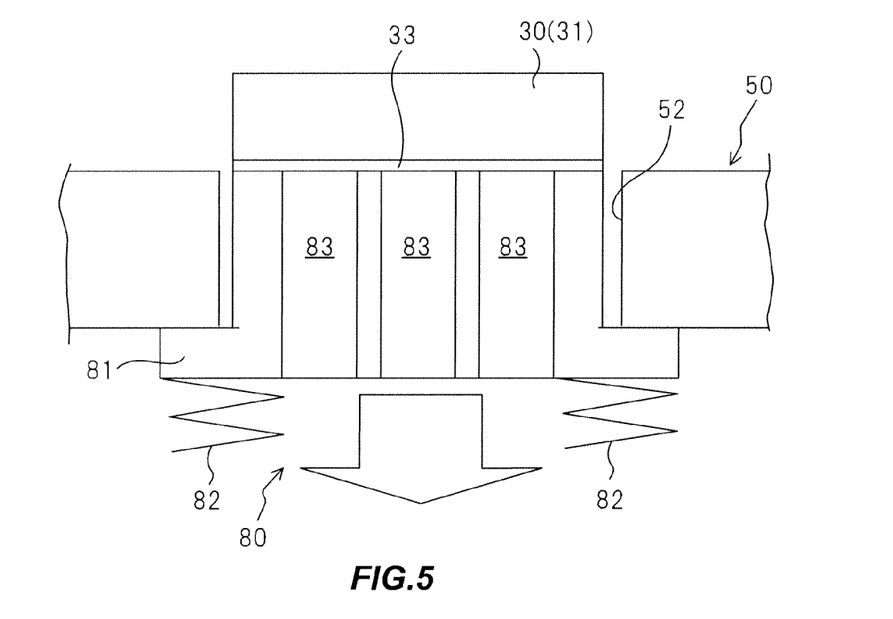
FIG. 5 is a cross-sectional view showing a configuration of an elevator member.

FIG. 5 is an enlarged view showing a part of the suction device 80. As shown in FIG. 5, the suction device 80 has an elevator member 81 that is inserted in the through-hole 52 of the lower tool 50 in such a manner that the elevator member 81 can be raised and lowered therein. The elevator member 81 is pushed by an elastic medium 82 (e.g., spring) arranged on the lower side thereof such that the elevator member 81 moves upward. The position of the elevator member 81 is set as follows: engagement of a flange provided in a lower portion of the elevator member 81 with the lower tool 50 places the elevator member 81 at a default position in which the upper end surface of the elevator member 81 is substantially at the same height as the upper surfaces of the projections 51 of the lower tool 50. When the elevator member 81 is at the default position, the upper surface thereof opposes the lower surface of the magnet 30 with no space or a small space therebetween. At the time of fracturing the magnet 30, the magnet 30 is lowered by being pushed down by the blade 61, and hence the elevator member 81 is lowered as well by being pushed down by the lower end of a fractured portion of the magnet 30 in resistance to the elastic medium 82. When the fractured portion of the magnet 30 is raised back up in synchronization with raising of the blade 61 upon completion of the fracture, the elevator member 81 is raised back up to the default position by the elastic medium 82, and the fractured magnet piece 31 is pushed back up onto the projection 51 of the upper tool 60.

The elevator member 81 has a suction nozzle 83 made up of a plurality of openings that penetrate through the elevator member 81 in the up-down direction. The elevator member 81 is connected to a suction machine 85 via a plumbing hose 84 connected to these openings. The suction nozzle 83, the plumbing hose 84 and the suction machine 85 constitute the suction device 80. Therefore, the suction device 80 suctions the air from the upper side of the openings. The action of the suction device 80 makes the crush powder, which is produced at the time of fracturing the magnet 30 and is accumulated or scattered on the upper portion of the elevator member 81, suctioned and discharged to the outside of the tool set.

In the magnet fracture apparatus configured in the above manner, the magnet 30 is placed on the projections 51 of the lower tool 50, and the position of the first intended fraction surface of the magnet 30 is set between the elevator member 81 and the blade 61 of the upper tool 60 by the pusher 71 and the holder 72 of the positioning device 70.

Once the position of the magnet 30 has been set, the holder 72 comes out of contact with the magnet 30, and then the upper tool 60 is lowered. The magnet bounce prevention clamp 62 provided in the upper tool 60 comes into contact with the upper surface of the magnet 30 so as to elastically press the magnet 30 against the projections 51 of the lower tool 50. As a result, the magnet 30 is held in an immobile fashion.

By further lowering the upper tool 60, the distal end (lower end) of the blade 61 comes into contact with the intended fracture surface of the magnet 30, and the magnet 30 is pushed down in the form of three-point bending involving the distal end (lower end) of the blade 61 and a pair of projections 51 located at the front side and the rear side of the through-hole 52 of the lower tool 50. As a result, the magnet 30 is fractured. The elevator member 81 is pushed down by the lower end of the fractured portion of the magnet 30, which is lowered by being pushed down by the blade 61. As a result, the elevator member 81 is lowered in resistance to the elastic medium 82. At the same time, bouncing of the magnet 30 is suppressed by the magnet bounce prevention clamp 62.

The crush powder produced at the time of fracturing the magnet 30 is not accumulated or scattered on the upper portion of the elevator member 81 as it is suctioned into the openings of the suction nozzle 83 together with the air and then discharged. This suppresses attachment of the crush powder to the upper surfaces of the projections 51 of the lower tool 50 and to the lower surface of the magnet 30.

Figure 12:
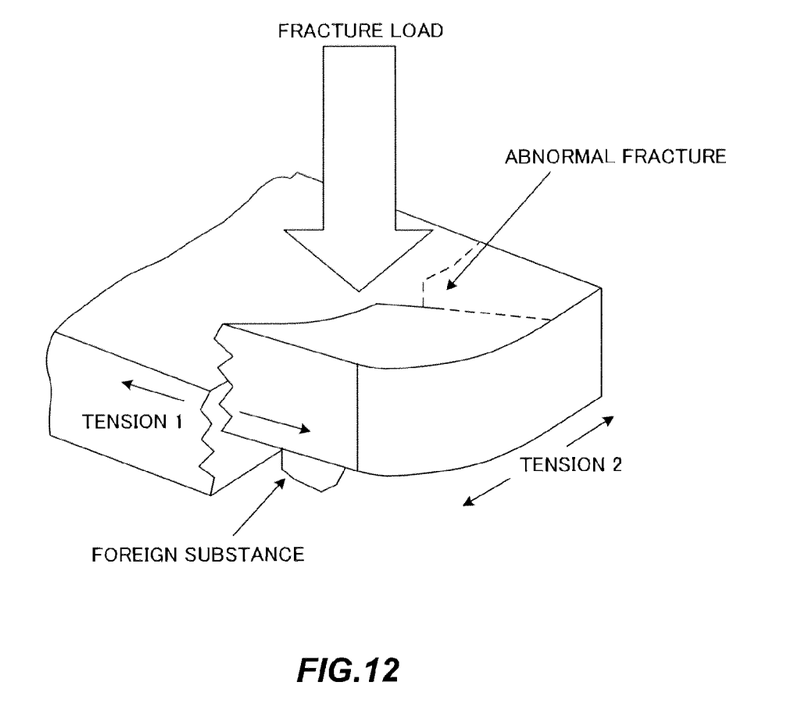
FIG. 12 is an illustrative view showing the state of abnormal fracture at the time of fracturing a magnet.

As the crush powder produced at the time of fracturing the magnet 30 does not attach to or accumulate on the upper surfaces of the projections 51 of the lower tool 50, it is not jammed between the upper surfaces of the projections 51 of the lower tool 50 and the magnet 30. This prevents the magnet 30 from being supported while being separated from the projections 51 of the lower tool 50. If the magnet 30 is supported while being separated from the projections 51 of the lower tool 50 as shown in FIG. 12 as a result of jamming of the crush powder between the projections 51 of the lower tool 50 and the magnet 30, the crush powder, i.e., the foreign substance causes abnormal fracture at the time of fracturing the magnet 30. More specifically, under the presence of the foreign substance, the magnet 30 is subject not only to tension 1 in the longitudinal direction of the magnet 30, which naturally occurs at the time of fracture, but also to abnormal tension 2 in the width direction of the magnet 30. The action of this abnormal tension 2 causes the magnet 30 to be bent along the longitudinal direction. Consequently, as indicated by dashed lines in FIG. 12, the magnet 30 is fractured along the longitudinal direction as well, that is to say, the magnet 30 is fractured abnormally, with the result that the surface accuracy of fracture surfaces is reduced. When the crush powder (contaminant) has a size of 20 μm or more, the crush powder makes the magnet 30 supported while being separated from the projections 51 of the lower tool 50, and therefore causes abnormal fracture of the magnet 30.

However, in the magnet fracture apparatus according to the present embodiment, the crush powder is suctioned into the openings of the suction nozzle 83 of the elevator member 81 together with the air, and then discharged. Therefore, the crush powder is prevented from attaching to or accumulating on the upper surfaces of the projections 51 of the lower tool 50. As the crush powder is not jammed between the projections 51 of the lower tool 50 and the magnet 30, the magnet 30 is not supported while being separated from the projections 51 of the lower tool 50. This makes it possible to prevent the occurrence of the aforementioned abnormal fracture of the magnet 30, and to improve the surface accuracy of fracture surfaces.

When the fractured portion of the magnet 30 is raised back up in synchronization with raising of the upper tool 60 and the blade 61 after the fracture, the elevator member 81 is also raised back up to the default position by the elastic medium 82, pushing back the fractured magnet piece 31. Once the upper tool 60 has returned to a default position, the magnet bounce prevention clamp 62 provided in the upper tool 60 comes out of contact with the upper surface of the magnet 30, and therefore holding of the magnet 30 is released. After being fractured off the magnet 30, the magnet piece 31 at the distal end is conveyed by a conveyance device (not shown in the drawings), aligned in order of fracture, and integrated by bonding via an adhesive agent in the subsequent processes.

Thereafter, the pusher 71 of the positioning device 70 pushes the magnet 30 by one pitch, and the holder 72 applies a braking force to the magnet 30 by coming into contact with the front end of the magnet 30. As a result, the position of the next intended fracture surface of the magnet 30 is set between the elevator member 81 and the blade 61 of the upper tool 60.

Then, the above-described operation for fracturing the magnet 30 by lowering the upper tool 60 and for moving the magnet 30 by one pitch with the positioning device 70 is repeated. During this operation, the air nozzle 91, which is provided as a cleaning means in the pusher 71 of the positioning device 70, blows the air onto the upper surface of a projection 51 that is exposed to the upper side due to the conveyance of the magnet 30. In this way, the upper surface of the exposed projection 51 is cleaned, and attachment and accumulation of the crush powder are suppressed. Therefore, in the state where the last intended fracture surface of the magnet 30 has been fractured and the last magnet piece 31 has been conveyed out of the lower tool 50 by the pusher 71 of the positioning device 70, the crush powder is blown away from all of the upper surfaces of the projections 51 of the lower tool 50, so that there is no attachment or accumulation of the crush powder thereon.

According to the magnet fracture apparatus with the above-described configuration, the suction nozzle 83 of the elevator member 81 is arranged between the pair of projections 51 of the lower tool 50 at which the fracture operation is executed for the magnet 30. In this way, the suction nozzle 83 can suction and discharge the crush powder (contaminant) produced at the time of fracturing the magnet 30. Consequently, the crush powder can be prevented from attaching to the upper surfaces of the projections 51 of the lower tool 50 and to the lower surface of the magnet 30.

As the crush powder is not jammed between the projections 51 of the lower tool 50 and the magnet 30, the magnet 30 is not supported while being separated from the projections 51 of the lower tool 50. This makes it possible to prevent the occurrence of the aforementioned abnormal fracture of the magnet 30, and to improve the surface accuracy of fracture surfaces.

Furthermore, at the time of fracturing the magnet 30, the elevator member 81 provided with the suction nozzle 83 is lowered in synchronization with lowering of a fracture surface caused by the fracture of the magnet 30. This makes it possible to prevent the magnet 30, and in particular fracture surfaces, from getting damaged and scratched. Moreover, as the elevator member 81 is located at the site of fracture, the fractured magnet piece 31 can be prevented from falling off between the pair of projections 51.

Figure 6:
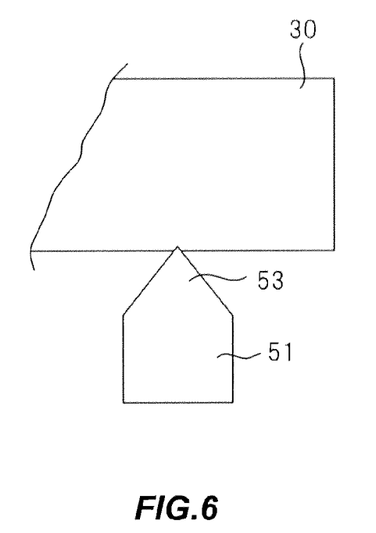
FIG. 6 shows an example of a modified configuration of projections of a lower tool.
Figure 7:
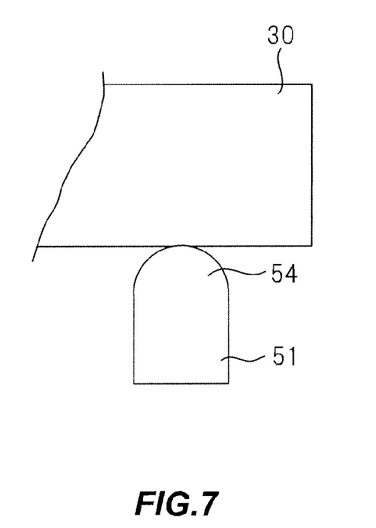
FIG. 7 shows an example of another modified configuration of the projections of the lower tool.

FIGS. 6 and 7 show examples of a modified configuration of the projections 51 of the lower tool 50. In FIGS. 6 and 7, the shape of the upper end of each projection 51 of the lower tool 50 that comes into contact with the magnet 30 is changed from a flat surface to a convexity, and therefore comes into line contact with the magnet 30 along the width direction of the magnet 30. More specifically, the distal end portion of a projection 51 shown in FIG. 6 is formed in the shape of a convexity 53 having a mountain-like cross-section, and therefore comes into line contact with the magnet 30 along the width direction of the magnet 30. On the other hand, the distal end portion of a projection 51 shown in FIG. 7 is formed in the shape of a convexity 54 having an arc-like cross-section, and therefore comes into line contact with the magnet 30 along the width direction of the magnet 30.

When the distal end portions of the projections 51 are thus formed in the shape of the convexity 53 or 54, contact between the projections 51 of the lower tool 50 and the magnet 30 takes a form of line contact instead of surface contact. In this way, the area of contact therebetween is reduced, and therefore the amount of crush powder (contaminant) intervening between contacting surfaces is reduced. This makes it possible to stably support the magnet 30, and to fracture the magnet 30 in a more straight fashion. As a result, fracture positions can be set according to "end-based positioning" in which the position of the magnet 30 in the longitudinal direction is set on the basis of the front and rear ends of the magnet 30, instead of "center-based positioning" in which the position of the magnet 30 in the longitudinal direction is set such that an intended fracture surface is located at the center of a space between projections 51 that are arranged at the front side and the rear side of the intended fracture surface. This makes it possible to significantly improve the flexibility of fracture positions.

The present embodiment can achieve the following effects.

(A) According to the field-pole magnet manufacturing apparatus, the magnet 30 is placed on a pair of projections 51 provided in the lower tool 50, and the blade 61 of the upper tool 60 is lowered between the pair of projections 51 so that the blade 61 comes into contact with and presses the upper portion of the magnet 30. As a result, the magnet 30 is fractured. This field-pole magnet manufacturing apparatus includes the elevator member 81 and the suction device (suction means) 80 (nozzle 83). The elevator member 81 can be raised and lowered between the pair of projections 51 of the lower tool 50, with the upper end thereof opposing the lower surface of the magnet 30. The elevator member 81 is lowered in synchronization with lowering of the site of fracture at the time of fracturing the magnet 30, and is raised upon completion of the fracture, pushing back the site of fracture. The suction device 80 suctions and discharges crush powder, which is produced by the fracture of the magnet 30, via the upper ends of the openings in the elevator member 81.

The suction nozzle 83 is provided as a suction means in the elevator member 81 that is lowered in synchronization with lowering of the site of fracture at the time of fracturing the magnet 30, and that is raised upon completion of the fracture, pushing back the site of fracture. The suction nozzle 83 can completely suction and discharge the crush powder (contaminant) produced at the time of fracturing the magnet 30 in accordance with the movement of the site of fracture. In this way, the crush powder can be prevented from attaching to the upper surfaces of the projections 51 of the lower tool 50 and to the lower surface of the magnet 30. As the crush powder is not jammed between the projections 51 of the lower tool 50 and the magnet 30, the magnet 30 is not supported while being separated from the projections 51 of the lower tool 50. As a result, the occurrence of the aforementioned abnormal fracture of the magnet 30 can be prevented, and the surface accuracy of fracture surfaces can be improved.

Furthermore, at the time of fracturing the magnet 30, the elevator member 81 is lowered in synchronization with lowering of a fracture surface caused by the fracture of the magnet 30. This makes it possible to prevent the magnet 30, and in particular fracture surfaces, from getting damaged and scratched. Moreover, as the elevator member 81 is located at the site of fracture, the fractured magnet piece 31 can be prevented from falling off between the pair of projections 51.

(B) The distal end portions of the pair of projections 51 of the lower tool 50 that come into contact with the magnet 30 are formed in the shape of the convexity 53 or 54 having a mountain-like cross-section. When the distal end portions of the projections 51 of the lower tool 50 are thus formed in the shape of the convexity 53 or 54, contact between the projections 51 and the magnet 30 takes a form of line contact instead of surface contact. In this way, the area of contact therebetween is reduced, and therefore the amount of crush powder (contaminant) intervening between contacting surfaces is reduced. This makes it possible to stably support the magnet 30, and to fracture the magnet 30 in a more straight fashion.

(C) The lower tool 50 has support projections 51 and the positioning device (positioning means) 70. The support projections 51 are arranged at a predetermined interval on the outer side of a pair of projections 51 so as to support the magnet 30 in a pre-fracture state. The positioning device 70 sets the position of the magnet 30 supported by the support projections 51 by sequentially pushing the distal end side of the magnet 30 onto the pair of projections 51. The lower tool 50 also has the air nozzle 91 that is provided in the positioning device 70 as a cleaning means. The air nozzle 91 blows gas to clean the upper surfaces of the support projections 51 or the pair of projections 51 that are exposed to the upper side at the rear end side of the magnet 30 pushed by the positioning device 70.

As the air nozzle 91 blows the air onto and cleans the upper surfaces of the projections 51 that are exposed to the upper side due to the conveyance of the magnet 30, attachment and accumulation of the crush powder are suppressed. Therefore, in the state where the last intended fracture surface of the magnet 30 has been fractured and the last magnet piece 31 has been conveyed out of the lower tool 50 by the positioning device 70, the crush powder is blown away from all of the upper surfaces of the projections 51 of the lower tool 50, so that there is no attachment or accumulation of the crush powder thereon.

Second Embodiment

Figure 8:
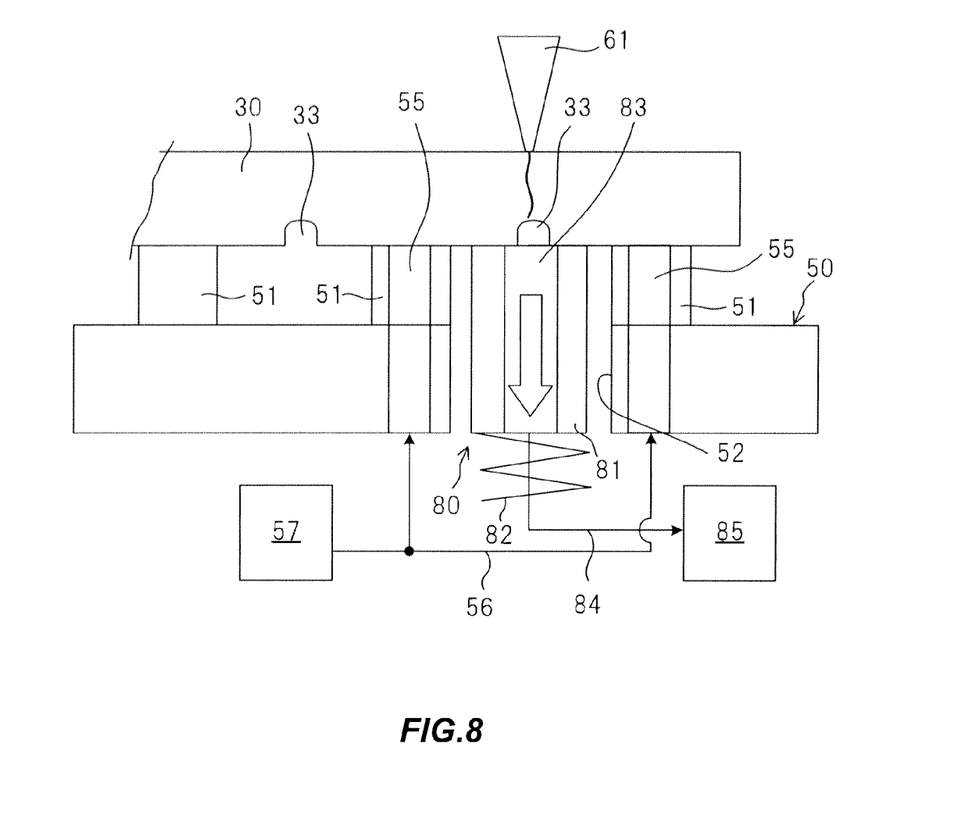
FIG. 8 is a schematic configuration view showing a field-pole magnet manufacturing apparatus according to a second embodiment.

FIG. 8 is a schematic configuration view showing a magnet fracture apparatus representing a field-pole magnet manufacturing apparatus according to a second embodiment. The present embodiment is achieved by adding, to the configuration of the first embodiment, a configuration for blowing the air onto the upper surfaces of a pair of projections located at the front side and the rear side of a through-hole in a lower tool. It should be noted that the components that are the same as the components of the manufacturing apparatus according to the first embodiment are given the same reference signs thereas, and a description thereof is omitted or simplified below.

According to the magnet fracture apparatus according to the second embodiment shown in FIG. 8, air blow openings 55 penetrate in the up-down direction through the pair of projections 51 located at the front side and the rear side of a through-hole 52 in a lower tool 50 supporting a magnet 30. The air is supplied to these air blow openings 55 so that the air is blown from the upper surfaces of the projections 51. For this purpose, an air supply device 57 is connected to the air blow openings 55 via pipes 56. Other components are similar to the components according to the first embodiment.

The air blown from the air blow openings 55 travels between the upper surfaces of the projections 51 and the lower surface of the magnet 30 placed on the projections 51, and flows toward the front and rear sides of the air blow openings 55. As a result, crush powder (contaminant) that has attached to the magnet 30 and the projections 51 is blown away and discharged to the outside of a tool set. A suction device 80, which is provided to an elevator member 81 arranged inside the through-hole 52, suctions the crush powder blown away toward the through-hole 52 and discharges the crush powder to the outside of the tool set. As a result, there is no foreign substance between contacting surfaces of the magnet 30 and the pair of projections 51. Therefore, the magnet 30 can be stably supported in an excellent contact state, abnormal fracture of the magnet 30 can be prevented at the time of fracturing the magnet 30, and the magnet 30 can be fractured in a straight fashion.

While FIG. 8 shows the configuration in which the upper ends of the pair of projections 51 are flat and therefore come into surface contact with the magnet 30, the upper ends of the projections 51 may be formed in the shape of a convexity 53 or 54 such that they come into line contact with the magnet 30 as in a second working example of the first embodiment (FIGS. 6 and 7). When the projections 51 are in line contact with the magnet 30, the aforementioned effect of the present embodiment can be further improved.

In the present embodiment, the following effect can be achieved in addition to the effects (A) to (C) according to the first embodiment.

(D) Gas is blown from the distal end portions of the pair of projections 51 of the lower tool 50 that come into contact with the magnet 30. As a result, there is no foreign substance between contacting surfaces of the magnet 30 and the pair of projections 51. Therefore, the magnet 30 can be stably supported in an excellent contact state, abnormal fracture of the magnet 30 can be prevented at the time of fracturing the magnet 30, and the magnet 30 can be fractured in a straight fashion.

Third Embodiment

Figure 9:
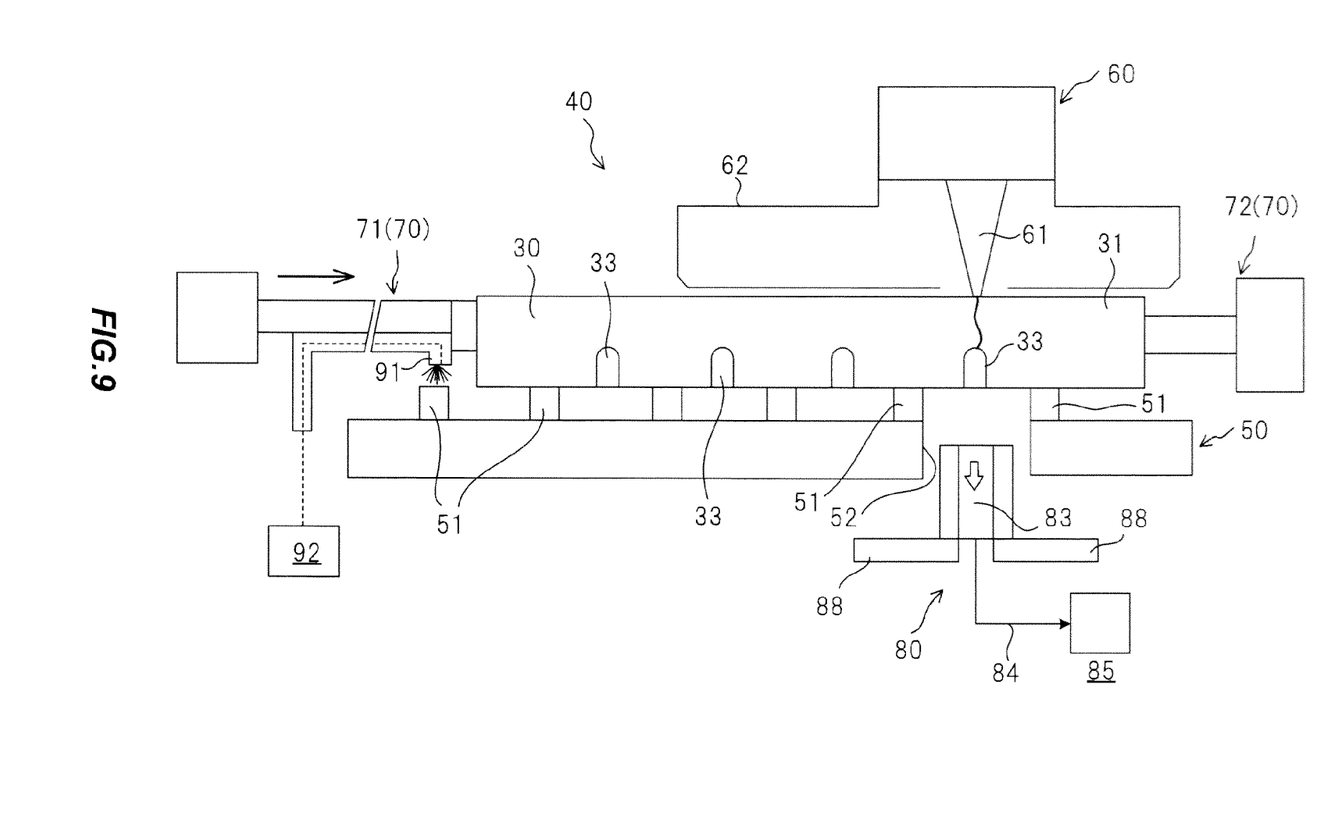
FIG. 9 is a schematic configuration view showing a field-pole magnet manufacturing apparatus according to a third embodiment.

FIG. 9 is a schematic configuration view showing a magnet fracture apparatus representing a field-pole magnet manufacturing apparatus according to a third embodiment. The field-pole magnet manufacturing apparatus according to the third embodiment differs from the field-pole magnet manufacturing apparatus according to the first embodiment in a configuration of a suction device 80. More specifically, in the present embodiment, the suction device 80 does not include an elevator member, and is fixed to a base 88. In this configuration also, the suction device 80 can suction crush powder produced at the time of fracturing the magnet 30 and discharge the crush powder to the outside of a tool set.

Fourth Embodiment

Figure 10:
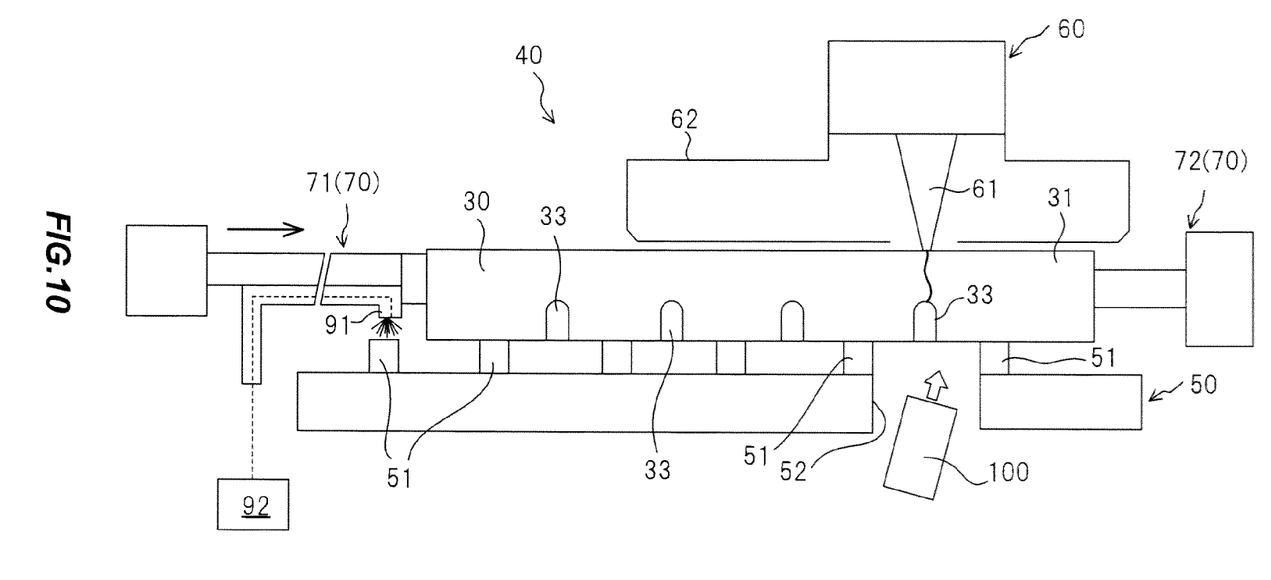
FIG. 10 is a schematic configuration view showing a field-pole magnet manufacturing apparatus according to a fourth embodiment.

FIG. 10 is a schematic configuration view showing a magnet fracture apparatus representing a field-pole magnet manufacturing apparatus according to a fourth embodiment. The field-pole magnet manufacturing apparatus according to the fourth embodiment differs from the field-pole magnet manufacturing apparatus according to the first embodiment in that a blower 100 is provided in place of a suction device 80. The blower 100 blows a strong wind from a blowoff opening so as to blow away and remove crush powder produced at the time of fracturing a magnet 30.

Figure 11:
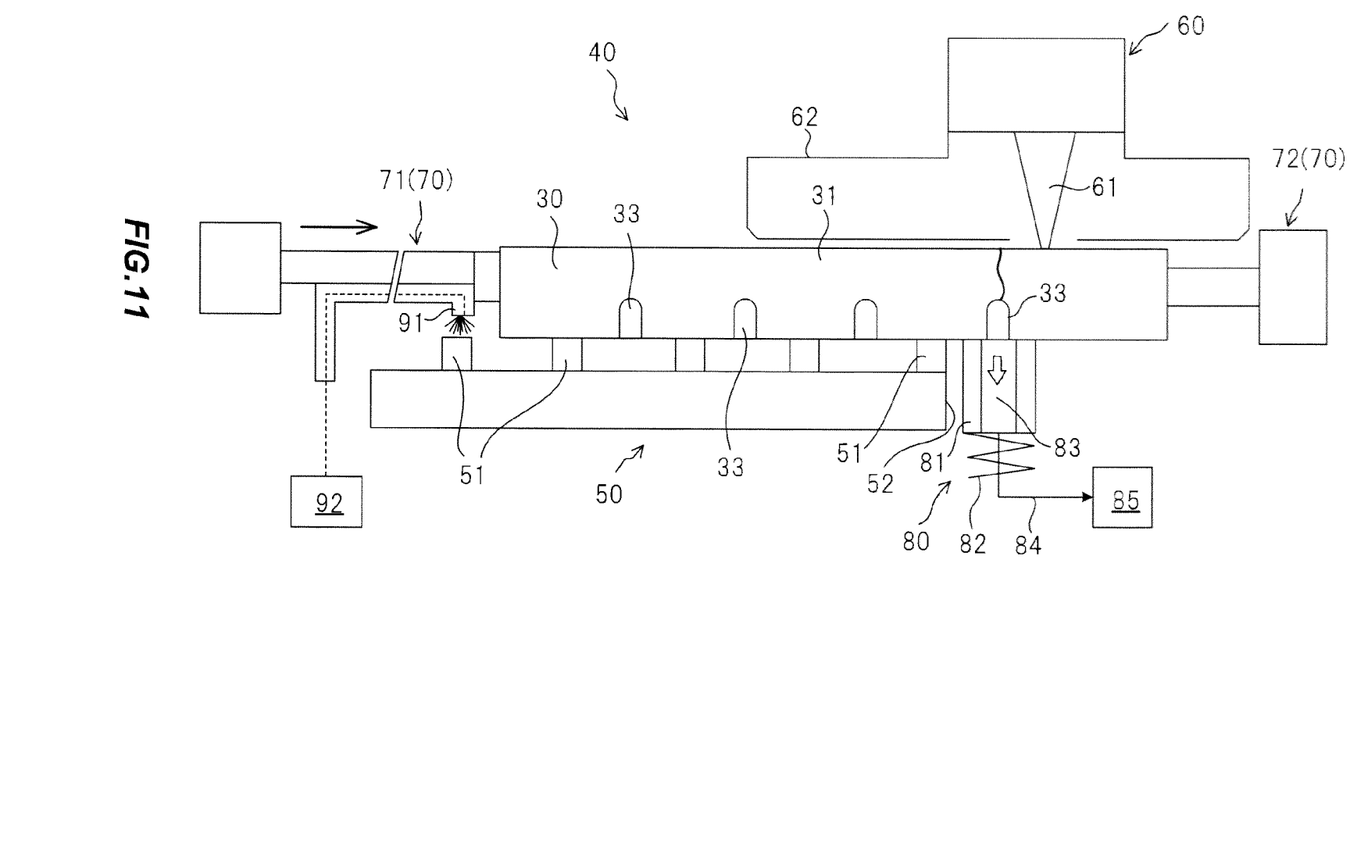
FIG. 11 is a schematic configuration view showing a field-pole magnet manufacturing apparatus in which one of a pair of projections is absent.

In the first embodiment, the magnet 30 is fractured in the form of three-point bending involving the blade 61 of the upper tool 60 and the pair of projections 51 of the lower tool 50. However, as shown in FIG. 11, the magnet 30 can be fractured also in a configuration in which one of the pair of projections is absent.

The present application claims the benefit of priority from Japanese Patent Application No. 2011-164245, filed Jul. 27, 2011 with the Japan Patent Office, the disclosure of which is incorporated herein by reference in its entirety.

The invention claimed is:

1. A field-pole magnet manufacturing apparatus for manufacturing magnet pieces that constitute a field-pole magnet arranged in a rotary electric machine by fracturing a magnet, the apparatus comprising:
   a pair of support units on which the magnet is placed;
   a fracture unit that is arranged opposite to the pair of support units across the magnet, the fracture unit including a blade configured to fracture the magnet by pressing the blade against the magnet; and
   a powder removal unit that is arranged under the magnet and between the pair of support units and is configured to remove crush powder produced by fracture of the magnet.

2. The field-pole magnet manufacturing apparatus according to claim 1, further comprising:
   an elevator unit arranged such that the elevator unit can be raised and lowered between the pair of support units, an upper end of the elevator unit opposing a lower surface of the magnet, the elevator unit being lowered in synchronization with lowering of a site of fracture at the time of fracturing the magnet, and the elevator unit being raised upon completion of the fracture so as to push back the site of fracture, wherein the powder removal unit is provided to the elevator unit.

3. The field-pole magnet manufacturing apparatus according to claim 1, wherein the powder removal unit is a suction unit that is configured to suction the crush powder.

4. The field-pole magnet manufacturing apparatus according to claim 1, wherein the pair of support units is a pair of projections, and the pair of projections blows gas from distal end portions thereof that come into contact with the magnet.

5. The field-pole magnet manufacturing apparatus according to claim 1, further comprising:

support projections arranged at a predetermined interval on an outer side of the pair of support units so as to support the magnet in a pre-fracture state;

a positioning unit that is configured to set a position of the magnet by sequentially pushing a distal end side of the magnet supported by the support projections onto the pair of support units; and a cleaning unit that is configured to clean upper surfaces of the support projections or the pair of support units with blown gas, the upper surfaces being exposed to an upper side at a rear end side of the magnet pushed by the positioning unit.

6. A field-pole magnet manufacturing method for manufacturing magnet pieces that constitute a field-pole magnet arranged in a rotary electric machine by fracturing a magnet, the method comprising:

placing the magnet on a pair of support units;

fracturing the magnet by pressing a blade against the magnet from a side opposite to the pair of support units; and removing crush powder produced by fracture of the magnet from a portion below the magnet and between the pair of support units.

7. The field-pole magnet manufacturing method according to claim 6, further comprising:

causing an upper end of an elevator member to oppose a lower surface of the magnet in a pre-fracture state, the elevator member being arranged such that the elevator member can be raised and lowered between the pair of support units;

lowering the elevator member in synchronization with lowering of a site of fracture at the time of fracturing the magnet; and raising the elevator member upon completion of the fracture so as to push the fractured magnet back to a position of the magnet in the pre-fracture state.

8. The field-pole magnet manufacturing method according to claim 6, wherein the pair of support units is a pair of projections, and the pair of projections blows gas from distal end portions thereof that come into contact with the magnet.

9. The field-pole magnet manufacturing method according to claim 6, wherein the magnet in the pre-fracture state is supported by support projections that are arranged at a predetermined interval on an outer side of the pair of support units, and the field-pole magnet manufacturing method further comprises:

setting a position of the magnet by sequentially pushing a distal end side of the magnet supported by the support projections onto the pair of support units; and cleaning upper surfaces of the support projections or the pair of support units with blown gas, the upper surfaces being exposed to an upper side at a rear end side of the pushed magnet.

10. A field-pole magnet manufacturing apparatus for manufacturing magnet pieces that constitute a field-pole magnet arranged in a rotary electric machine by fracturing a magnet, the apparatus comprising:

a pair of support means for placing the magnet thereon;

a fracture means, arranged opposite to the pair of support means across the magnet, for fracturing the magnet, the fracture means including a blade configured to press against the magnet to fracture the magnet; and a powder removal means, arranged under the magnet and between the pair of support means, for removing crush powder produced by fracture of the magnet.

\* \* \* \* \*